United States Patent [19]

Atkins

[11] 3,725,748

[45] Apr. 3, 1973

[54] SELF-ADJUSTING CONDITION-RESPONSIVE CONTROL CIRCUIT

[75] Inventor: Carl E. Atkins, Montclair, N.J.

[73] Assignee: Wagner Electric Corporation, Newark, N.J.

[22] Filed: Nov. 8, 1971

[21] Appl. No.: 196,440

[52] U.S. Cl. ..................317/146, 307/251, 307/304, 317/DIG. 2

[51] Int. Cl. ..............................................H01h 47/12

[58] Field of Search..317/146, DIG. 2; 307/251, 304; 328/5

[56] References Cited

UNITED STATES PATENTS

| | | | |
|---|---|---|---|
| 3,575,640 | 4/1971 | Ishibawa | 317/146 X |
| 3,568,006 | 3/1971 | Atkins | 317/146 |
| 3,541,354 | 11/1970 | Basham | 307/251 |
| 3,508,120 | 4/1970 | Atkins | 328/5 X |

*Primary Examiner*—J. D. Miller
*Assistant Examiner*—Harry E. Moose, Jr.
*Attorney*—William D. Lucas

[57] ABSTRACT

The output of an oscillator is normally continuously varied within predetermined limits so that a first, load-controlling relay is normally de-energized and a second relay is normally energized and de-energized alternately to continuously vary the input voltage to a filed-effect transistor connected in the output of said oscillator. Thus, the circuit "hunts" about a reference level of detected capacitance and compensates for both slow variations from that reference level and drift in values of circuit elements, but will cause a load to become energized in response to a rapid change in detected capacitance.

10 Claims, 1 Drawing Figure

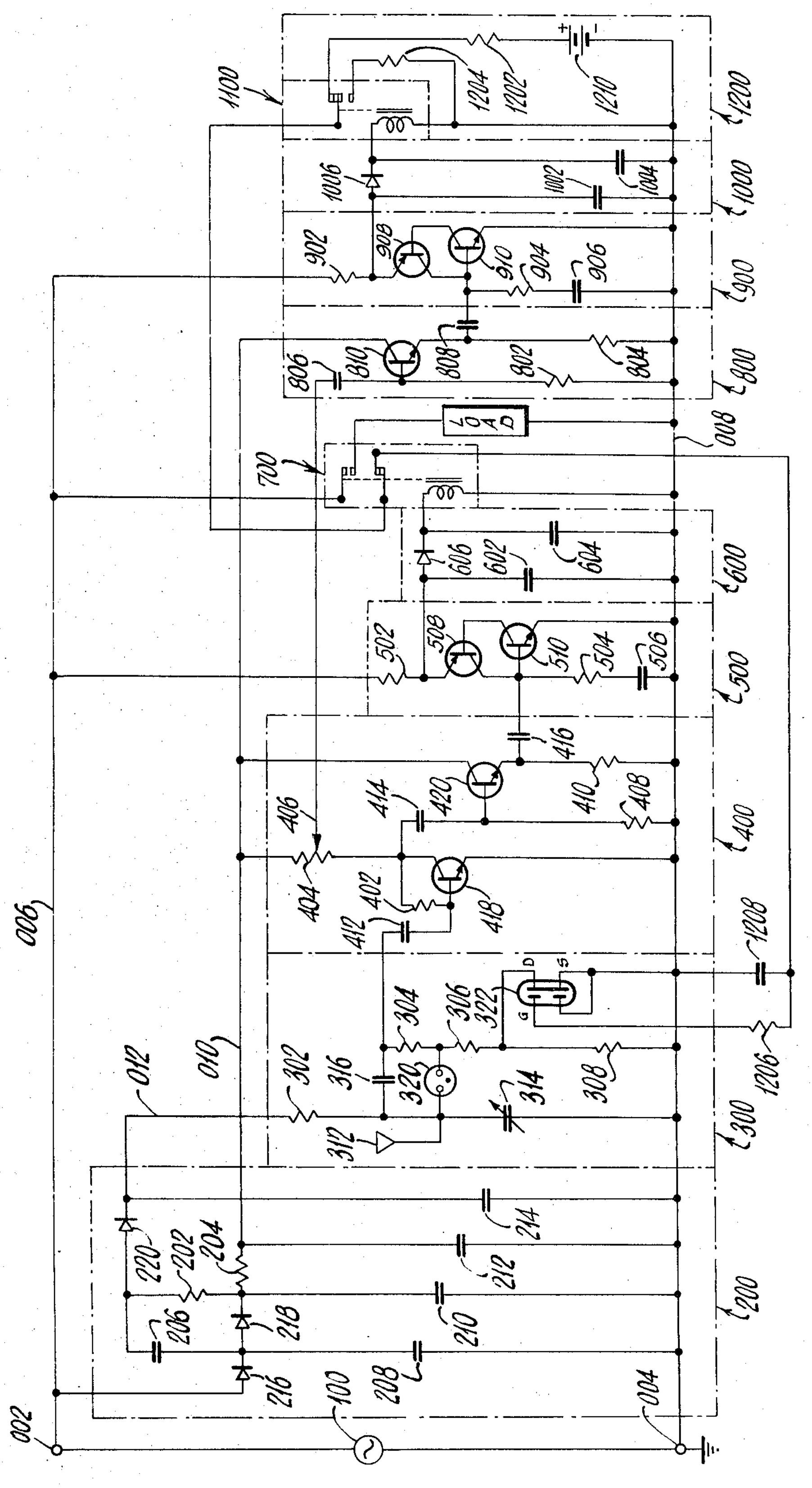

SELF-ADJUSTING CONDITION-RESPONSIVE CONTROL CIRCUIT

BACKGROUND OF THE INVENTION

1. - Field of the Invention

The present invention is properly classifiable in Class 317, subclass 146 (Oscillator-Controlled Electric Circuits for Relays and Electromagnets).

2. - Description of the Prior Art

Various control circuits responsive to a change in an electrical parameter, e.g., capacitance or resistance, are found in the prior art, and have numerous and diverse applications. See, for example, the following U. S. patents:

| U.S. Pat. No. | Inventor |
|---|---|
| 3,200,304 | Atkins et al. |
| 3,200,305 | Atkins |
| 3,275,897 | Atkins |
| Re26,828 | Atkins et al. |
| 3,314,081 | Atkins et al. |
| 3,339,212 | Atkins et al. |
| 3,382,408 | Atkins |
| 3,435,298 | Atkins et al. |
| 3,492,542 | Atkins |
| 3,551,753 | Atkins |
| 3,555,368 | Atkins |
| 3,564,346 | Atkins |
| 3,568,005 | Atkins |
| 3,568,006 | Atkins |
| 3,569,728 | Atkins |
| 3,571,666 | McGuirk |

However, the circuits disclosed in the aforementioned patents require careful adjustment in many applications, particularly since the magnitude of the signal to which the circuits are designed to respond is frequently quite small. In addition, difficulties with slow, long-term drift of the circuit elements have been encountered.

SUMMARY OF THE INVENTION

The present invention is embodied in and carried out by a condition-responsive control circuit which automatically adjusts the reference level of the monitored parameter in response to slow changes in that parameter and in circuit element values, but causes a change in the energization state of a load circuit in response to a rapid change in the monitored parameter. In other words, the present invention resides in a condition-responsive control circuit which is sensitive to the rate of change of the monitored parameter.

BRIEF DESCRIPTION OF THE DRAWING

A better understanding of the present invention may be had by reference to the accompanying drawing, which is a schematic diagram of the circuit which forms the preferred embodiment of the present invention.

DESCRIPTION OF THE PREFERRED EMBODIMENT

Referring now specifically to the drawing, a standard source of alternating current power 100 (117 volts RMS, 60 hertz) is connected between power input terminals 002 and 004. Terminal 002 is connected to conductor 006, and terminal 004, which is preferably grounded, is connected to conductor 008. An AC/DC power conversion circuit 200 provides a low-voltage DC output to conductor 010, and also provides a high-voltage DC output via conductor 012 to the low-frequency relaxation oscillator 300, the basic embodiment of which is described and claimed in U. S. Pat. No. 3,199,033 (Atkins et al.), the disclosure of which is hereby incorporated by reference. The output of oscillator 300 normally comprises a series of continuously varying pulses, which comprise the input to a two-stage, alternating-current amplifier 400, the output of which in turn controls the conductivity state of a first, normally conductive switching circuit 500. This self-biasing, positive-hysteresis switching circuit is described and claimed in U. S. Pat. No. 3,508,120 (Atkins), the disclosure of which is hereby incorporated by reference. A first rectifying and current-smoothing circuit 600 is connected between the output terminals of switching circuit 500 and the winding of load-controlling relay 700. Buffer circuit 800, which derives its lower-level input signal pulses from the Class A first stage of amplifier 400, controls a second switching circuit 900 which is connected through a second rectifying and current-smoothing circuit 1000 to the winding of relay 1100. The fixed contacts of relay 1100 are connected into a charging/discharging circuit 1200. The armature of relay 1100 is normally connected through the lower contact pair of relay 700 to capacitance 1208, which serves to bias the gate electrode G of the metal-oxide-semiconductor field-effect transistor (MOS FET) 322.

In operation, the output pulses of oscillator 300 are adjusted to be negative in polarity by means of variable capacitance 314, for example. These output pulses will vary in magnitude as the effective source S-to-drain D resistance of MOS FET 322 varies. However, the variations in magnitude must normally be within predetermined limits related to the triggering thresholds of first switching circuit 500, which must remain normally conductive to prevent energization of load-controlling relay 700, and of second switching circuit 900, which must normally be rendered alternately conductive and non-conductive. The output of oscillator 300 is fed to the two-stage, alternating-current amplifier 400, the first stage of which effects polarity inversion of the negative input pulses. The load resistance 404 of the first stage is adjustably connected by a tap 406 to provide input signal pulses to single-stage emitter-follower amplifier 800. The amplified, positive varying pulses fed to switching circuit 900, which absent any input signal is biased non-conductive by the bias storage circuit comprising resistance 904 and capacitance 906, cause this switching circuit to become alternately conductive and non-conductive as the magnitude of these pulses becomes greater and smaller, respectively. Consequently, relay 1100 is alternately de-energized and energized, respectively. When relay 1100 is de-energized as a result of relatively large input pulses being fed to switching circuit 900, a charging path is closed from the positive terminal of battery 1210 through resistance 1202, through the upper contact and armature of relay 1100, and through the lower armature and associated contact of relay 700 to capacitance 1208. As the positive charge on capacitance 1208 rises, the effective resistance between the drain and source electrodes of MOS FET 322 increases as a result of the positive voltage impressed upon the gate electrode by optional resistor 1206. Thus, the net resistance in the discharge path of capacitance 314 is increased, and the magnitude of the positive-going pulses developed across the combined resistances 306, 308 is likewise increased. The substantially constant-magnitude, negative-going pulses simultaneously developed across resistor 304 in the discharge path of capacitance 316 are opposed by these increased positive-going pulses, thereby causing the negative output pulses of oscillator 300 to be reduced in magnitude. Consequently, the magnitude of input signal pulses to switching circuit 900 is reduced to a level at which they are ineffective to overcome the bias voltage across capacitance 906, thereby causing switching circuit 900 to become non-conductive. Relay 1100 now becomes energized, thereby opening the aforementioned charging path to capacitance 1208 and closing a discharge path from that capacitance through the lower contact pair of relay 700, through the armature and lower contact of relay 1100 and through resistance 1204 to ground. As the positive voltage on capacitance 1208 decreases, the effective resistance between the drain and source electrodes of MOS FET 322 will decrease, thereby causing a decrease in the resistance of the discharge path of capacitance 314 in oscillator 300. As a result, the positive pulse developed across resistance 306, 308 will decrease, thereby causing an increase in the magnitude of the negative output pulses of oscillator 300. This increase will be sufficient to cause switching circuit 900 to be rendered conductive, thereby causing relay 1100 to become de-energized once again, and the charging of capacitance 1208 is effected as described above. In this manner, the circuit continually "hunts" about a reference level which may be varied according to the variations in capacitance to ground detected by antenna 312. The rate at which the circuit "hunts" is determined by the RC constants of the charging path and the discharging path of capacitance 1208. As such extraneous factors as humidity and temperature variations cause the detected capacitance to vary slowly, the circuit will automatically adjust its reference level, i.e., the value of detected no-signal capacitance to which a predetermined minimum increment of signal capacitance must be added or subtracted at a predetermined minimum rate to cause energization of the load.

When a person or object comes into proximity with the antenna 312, an additional increment of capacitance is added in series between antenna 312 and ground. Thus, there is an increase in the net capacitance formed by variable capacitance 314, antenna 312 and the person or object proximate to antenna 312, thereby causing the discharge current through neon tube 320 and resistances 306, 308 to increase. As a consequence, the pulses across resistances 306, 308 become more positive. Since these pulses are in opposition to the substantially constant negative pulses generated across resistance 304 by the discharge of capacitance 316 through neon tube 320 and that resistance, each net output pulse of the oscillator will become less negative. This decrease in magnitude causes the input pulses to switching circuit 500 to be decreased to a level at which they cannot overcome the turn-off bias voltage across capacitance 506. Consequently, switching circuit 500 becomes non-conductive, thereby causing energization of relay 700. Simultaneously, the charging/discharging current path from circuit 1200 to capacitance 1208 is interrupted by the opening of the lower contact pair of relay 700. Consequently, the reference level of detected capacitance is frozen because the source-to-drain resistance of MOS FET 322 is held at a substantially constant value. Since capacitance 1208 can no longer discharge through relays 700 and 1100, and cannot discharge through resistance 1206 and the gate electrode of MOS FET 322 as a result of the extremely high input resistance, the source-to-drain resistance of MOS FET 322 must remain substantially constant. When the signal capacitance, i.e., the increment of capacitance between antenna 312 and ground added by the proximity of a person or object, is removed as a result of that person or object no longer being in proximity with antenna 312, the input pulses to switching circuit 500 will become more positive and again render that switching circuit conductive. Relay 700 will thus become de-energized, and re-establish the original connection of charging/discharging circuit 1200 to capacitance 1208, and disconnect the load from the source of power. The "hunting" previously described now begins anew from the reference level of capacitance from antenna 312 to ground which existed at the time of energization of load-controlling relay 700.

The values of the various components of the disclosed circuit which is the preferred embodiment of the present invention are as follows:

| Resistances | Capacitances |
|---|---|
| **202** — 1 Meg | **206** — .0022uf |
| **204** — 22K | **208** — .22uf |
| **302** — 15 Meg | **210** — .47uf |
| **304** — 4.3K | **212** — .47uf |
| **306** — 27K | **214** — .01uf |
| **308** — 100K | **312** — 100pf - approx. |
| **402** — 330K | **314** — 300pf - " |
| **404** — 50K | **316** — 300pf - " |
| **406** — Arm of Control | **412** — .01uf |
| **408** — 100K | **414** — 100pf |
| **410** — 10K | **416** — .01uf |
| **502** — 8.2K | **506** — .1uf |
| **504** — 100K | **602** — .001uf |
| **802** — 100K | **604** — 16uf |
| **804** — 10K | **806** — 100pf |
| **902** — 8.2K | **808** — .01uf |
| **902** — 8.2K | **906** — .1uf |
| **904** — 100K | **1002** — .001uf |
| **1202** — 10 Meg | **1004** — 16uf |
| **1204** — 30 Meg | **1208** — .22uf |
| **1206** — 1 Meg | |
| Transistors | Diodes |
| **322** — 2N5457 | **216** — 1N5059 |
| **418** — 2N3567 | **218** — " |
| **420** — 2N3567 | **220** — " |
| **508** — 2N4248 | **606** — " |
| **510** — 2N3567 | **1006** — 1N4148 |
| **810** — 2N3567 | |
| **908** — 2N4248 | |
| **910** — 2N3567 | Relays |
| | **700** — RBM-61-167 |
| Neon Tube | **1100** — " |
| **320** — T2-27-1W250 | Battery |
| | **1210** — 6V |

The advantages of the present invention, as well as certain changes and modifications to the disclosed embodiment thereof, will be readily apparent to those skilled in the art. For example, the capacitance-responsive oscillator 300 may be modified to detect changes in resistance as taught by U. S. Pat. No. 3,500,374 or to monitor some other electrical parameter or condition. The output signal of oscillator 300 may be set to maintain the load-controlling relay 700 normally energized instead of normally de-energized. Instead of deriving a reduced first-stage signal by tapping the load resistance 404 in the first stage of amplifier 400 to provide a reduced (as compared to the signal provided to the second stage of amplifier 400) signal to amplifier 800 in order to provide lower-level input pulses to switching circuit 900, the switching circuit 900 may be modified to have a higher triggering voltage by the use of different transistors and biasing circuit components than switching circuit 500 in order to achieve the alternate switching between the conductive and non-conductive states by feeding the variable output pulses from amplifier 400 directly to modified switching circuit 900, or by connecting the output of the first stage of amplifier 400, without reduction or modification, directly to amplifier 800. The charging/discharging current path between the junction of capacitance 1208 and resistance 1206 and the armature of relay 1100 may be directly connected if, in a particular application, the reference level of detected capacitance at the time of energization of the load is not to be maintained beyond that event. In such an application of the present invention, the charging/discharging current path would be controlled only by relay 1100, and compensation for slow drift in the reference level and in circuit component values would be continuous regardless of the energization state of the load. A junction field effect transistor may be employed in lieu of the MOS FET 322, which is preferred because of its higher input (gate) impedance. Relays 700 and 1100 may be supplanted by suitable solid-state circuitry. It is the applicant's intention to cover all of these and any other changes and modifications which could be made to the embodiment of the invention herein chosen for the purposes of the disclosure without departing from the spirit and scope of the invention.

What is claimed is:

1. A self-adjusting, condition-responsive control circuit comprising:

1 first circuit means operative to generate a continuously-varying signal in the presence and absence of variations in ambient conditions, and further operative to alter the energization state of a load in response to rapid variations from a reference level of a monitored parameter; and 2 second circuit means operative in response to said continuously varying signal received from said first circuit means to adjust said reference level in response to slow variations in said monitored parameter.

2. The control circuit according to claim 1 wherein said first circuit means comprises a low-frequency relaxation oscillator having a voltage-controlled variable resistance connected in its output branch, said oscillator being operative to produce said continuously varying signal in the form of output pulses which are normally varied between predetermined upper and lower limits in response to variations in said voltage-controlled variable resistance.

3. The control circuit according to claim 2 wherein said voltage-controlled variable resistance is provided with a normally continuously varying control voltage by said second circuit means.

4. The control circuit according to claim 3 wherein said first circuit means comprises a two-stage amplifier operative to amplify the output signal of said oscillator, a first switching circuit controlled by the output of said amplifier, and first rectifying and current-smoothing circuit means connected between said switching circuit and a first, load-controlling relay to enable continuous energization of said first relay when said first switching circuit is non-conductive and to prevent energization of said first relay when said first switching circuit is conductive.

5. The control circuit according to claim 4 wherein said first, load-controlling relay comprises first and second armatures operative to control first and second pairs of contacts, respectively, said first pair of contacts being operative to control the energization state of a load and said second pair of contacts being operative to make or break the connection between said second circuit means and said voltage-controlled variable resistance.

6. The control circuit according to claim 4 wherein said continuously varying signal received from said first circuit means is derived from said first stage of said amplifier.

7. The control circuit according to claim 2 wherein said second circuit means comprises charging/discharging circuit means operative to provide said normally continuously varying control voltage to said voltage-controlled variable resistance in said oscillator.

8. The control circuit according to claim 7 wherein said charging/discharging circuit means comprises a capacitance, a second relay having its armature connected to the high terminal of said capacitance and having first and second contacts engageable by said armature to connect said capacitance to a charging current path or a discharging current path, respectively.

9. The control circuit according to claim 8 wherein the voltage across said capacitance comprises the normally continuously varying control voltage provided to said voltage-controlled variable resistance.

10. The control circuit according to claim 8 wherein said second relay is controlled by a second switching circuit which is normally rendered alternately conductive and non-conductive in response to said continuously varying signal received from said first circuit means and is connected to said second relay by second rectifying and current smoothing circuit means operative to enable continuous energization of said second relay when said second switching circuit is non-conductive and to prevent energization of said second relay when said second switching circuit is conductive.

* * * * *